(12) United States Patent
Nielsen

(10) Patent No.: US 6,695,588 B1
(45) Date of Patent: Feb. 24, 2004

(54) DAMPING OF OSCILLATIONS IN WIND TURBINES

(75) Inventor: Thomas Steiniche Bjertrup Nielsen, Randers (DK)

(73) Assignee: Neg Micon A/S, Randers (DK)

( * ) Notice: Subject to any disclaimer, the term of this patent is extended or adjusted under 35 U.S.C. 154(b) by 162 days.

(21) Appl. No.: 10/009,463

(22) PCT Filed: Jun. 15, 2000

(86) PCT No.: PCT/DK00/00320
§ 371 (c)(1),
(2), (4) Date: Jan. 16, 2002

(87) PCT Pub. No.: WO00/77394
PCT Pub. Date: Dec. 21, 2000

(30) Foreign Application Priority Data

Jun. 16, 1999 (DK) ..................................... 1999 00846

(51) Int. Cl.[7] ................................................. F03B 1/02
(52) U.S. Cl. ................. 416/244 R; 416/31; 416/244 A; 416/500; 416/DIG. 6
(58) Field of Search ............................ 416/31, 11, 41, 416/DIG. 6, DIG. 4, 244 R, 500, 244 A; 415/119

(56) References Cited

U.S. PATENT DOCUMENTS

| | | | |
|---|---|---|---|
| 4,226,554 A | 10/1980 | Vandiver et al. | |
| 4,515,525 A | 5/1985 | Doman | |
| 4,783,937 A | 11/1988 | Sato | |
| 4,873,798 A | 10/1989 | Sato | |
| 4,875,313 A | 10/1989 | Sato | |
| 4,922,671 A | 5/1990 | Sato | |
| 4,924,639 A | 5/1990 | Sato et al. | |
| 5,098,226 A | 3/1992 | Venugopal | |
| 5,990,568 A | 11/1999 | Hildingsson et al. | |
| 6,176,675 B1 * | 1/2001 | Engstrom | 415/4.3 |

FOREIGN PATENT DOCUMENTS

| | | |
|---|---|---|
| DK | 95 00 222 U3 | 9/1996 |
| EP | 0 648 906 | 12/1994 |
| EP | 0 686 733 | 12/1995 |
| EP | WO 99/32789 A1 | 7/1999 |
| EP | 10 08 747 A2 | 6/2000 |
| SE | 5 10 110 C2 | 4/1999 |

OTHER PUBLICATIONS

Fujii et al., "Wind–Induced Vibration of Tower and Practical Applications of Tuned Sloshing Damper," J. of Wind Engineering, No. 37, Oct. 1988, pp. 537–546.

Fujino et al., "Vibration Control by Multiple Tuned Liquid Dampers (MTLD)," J. of Structural Engineering, vol. 119, No. 12, Dec. 1993, pp. 3482–3502.

Miyata et al., "Study of Wind–Resistant Water Tank Damper for Damping Vibrations," J. of Wind Engineering, No. 32, May 1987, pp. 65–66, with English translation.

Modi et al., "Vibration Control Using Nutation Dampers," International Conference on Flow Induced Vibrations, Bowness–on–Windmere, England, May 12–14, 1987, pp. 369–376.

* cited by examiner

Primary Examiner—Edward K. Look
Assistant Examiner—J. M. McAleenan
(74) Attorney, Agent, or Firm—Birch, Stewart, Kolasch & Birch, LLP

(57) ABSTRACT

Damping of oscillations of the first bending mode of a wind turbine is performed means of one or more containers partly filled with a liquid for damping oscillations of the first natural bending frequency of the wind turbine. The damping means comprises a plurality of box shaped containers having a square cross section and being partly filled with liquid so as to provide a unidirectional damping with a logarithmic decrement of oscillations of the first natural bending frequency of the wind turbine of at least 4–8%. For off-shore wind turbines, the combined excitation of the wind and sea waves requires more damping, the damping is preferably equivalent to a logarithmic decrement of 10–15%. Furthermore, the invention relates to damping of oscillation of the second bending mode of a wind turbine and to the combined damping of oscillations of the first as well as the second bending mode of the wind turbine.

32 Claims, 1 Drawing Sheet

DAMPING OF OSCILLATIONS IN WIND TURBINES

Figure 1:
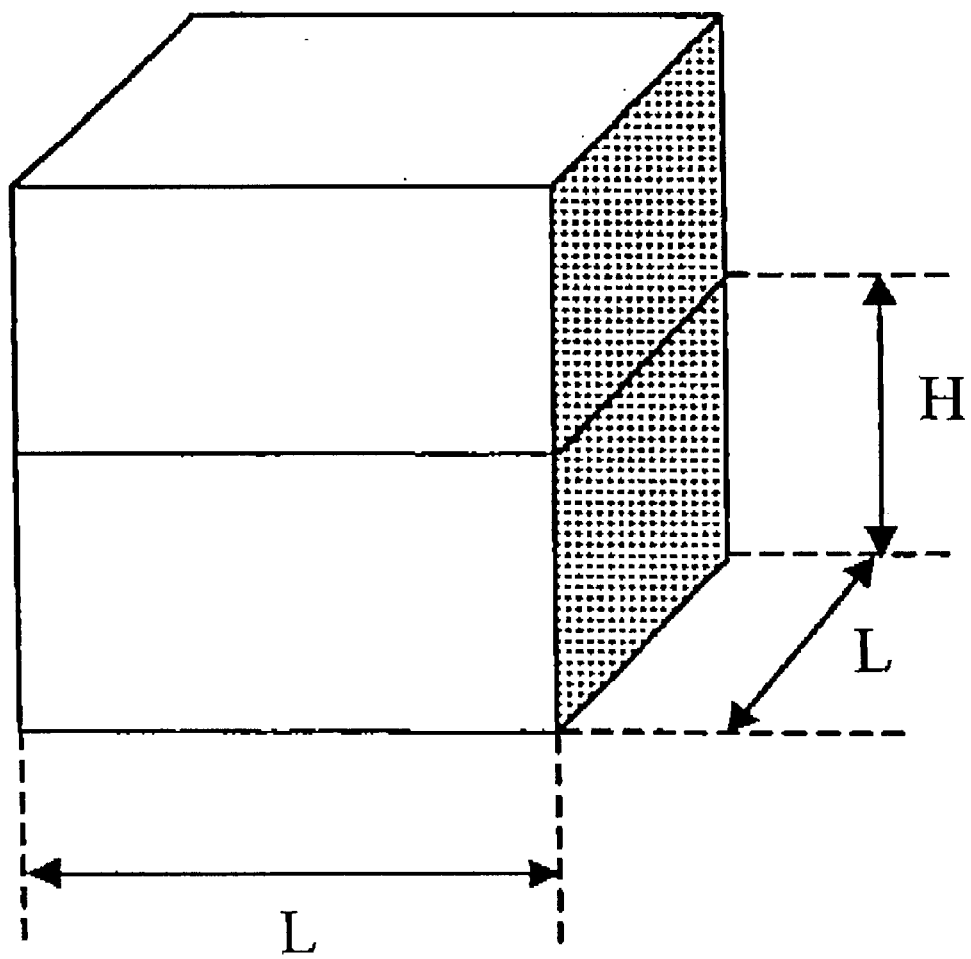

This application is the national phase under 35 U.S.C. §371 of PCT International Application No. PCT/DK00/00320 which has an International filing date of Jun. 15, 2000, which designated the United States of America and was published in English.

The present invention relates to damping of oscillations of the first bending mode of a wind turbine by means of oscillation damping means comprising one or more containers partly filled with a liquid for damping oscillations of the first natural bending frequency of the wind turbine.

In particular, the invention relates to damping means comprising a plurality of box shaped containers having a square cross section and being partly filled with liquid so as to provide a unidirectional damping of a magnitude being equivalent to a logarithmic decrement of oscillations of the first natural bending frequency of the wind turbine of at least 4–8%, the total mass of the liquid contained within the containers being equal to 1.2–1.8% of the mass of the nacelle. In case of off-shore positioned wind turbines, the combined excitation of the wind and sea waves requires more damping, the damping is preferably equivalent to a logarithmic decrement of 10–15%, which may be obtained with a total mass of the liquid being equal to 2–4% of the mass of the nacelle.

Furthermore, the invention relates to damping of oscillation of the second bending mode of a wind turbine and to the combined damping of oscillations of the first as well as the second bending mode of the wind turbine.

BACKGROUND

All tall buildings and constructions are excited by the wind in the full frequency spectrum including the natural bending frequencies of the building. Due to a positive proportionality between the horizontal forces on the building and the wind speed, the wind has a dampening effect on oscillations of the first natural bending frequency for buildings of a slender cylinder shape, such as chimneys, and for traditional wind turbines having such a characteristic of the horizontal forces.

Modem wind turbine has a characteristic of the horizontal forces that has a plateau or even has a negative proportionality to the wind speed above a certain limit. The latter characteristic is advantageous with respect to the power production of the wind turbine, but the construction becomes less stable because the wind will amplify oscillations of the wind turbine when the wind speed is above the limit, typically about 10 m/s. The negative proportionality has the consequence that the horizontal forces on the wind turbine increase when the top of the wind turbine swings away from the wind and the relative wind speed at the top decreases and that the horizontal forces decrease when the top wings towards the wind and the relative wind speed increases.

It is known from the prior art to dampen oscillations of the first natural bending frequency of wind turbines by means of mechanical damping means comprising one or more masses, springs and dampers. Such solutions to the oscillation problem are expensive for wind turbines since relatively large masses of the damping means must be used because the equivalent swinging mass in the first natural bending mode is very large since the nacelle comprising a power transmission system is arranged at the top of a slender tower.

It is known from EP 0 648 906 A1 and EP 0 686 733 A1 to dampen oscillation of slender buildings such as chimneys, masts etc. by means of containers being partly filled with liquid and being tuned to dampen the natural frequency of the building. The containers employed are of a quasi-symmetrical cross section such as circular, quadratic or triangular so as to exhibit quasi-symmetrical damping characteristics which are advantageous for buildings having a symmetrical oscillation behaviour. Similar damping of slender buildings with quasi-symmetrical containers is known from e.g. U.S. Pat. No. 4,873,798, U.S. Pat. No. 4,783,937, U.S. Pat. No. 4,924,639, U.S. Pat. No. 4,875.313 and U.S. Pat. No. 4,922 671. The principles of the applied containers may also be used for the present invention, but the damping of the natural frequency of a wind turbine is very different from damping the oscillations of a slender building.

Contrary to a slender building such as a chimney, the equivalent oscillating mass of the first natural bending mode is equal to 85–90% of the total mass of a wind turbine, whereas the equivalent mass of a chimney is about 10–15% of the total mass. This difference is due to the concentration of mass in the nacelle of the wind turbine which typically contribute with about 85% of the oscillating mass. Furthermore, the rotor arranged at the top of the wind turbine exposes the wind turbine to heavy wind forces at the top as well as to periodic excitation with the frequency of rotation of the rotor as well as three time (for a three blade wind turbine) the frequency of rotation. The formation of a von Karman vortex alley which is well known for slender building is on the other hand negligible for wind turbines.

Oscillations of wind turbines has always existed but it seems that the problem is getting more pronounced with the development of the new generation of very large wind turbines. At high wind speeds (>20 m/s) and some yaw errors calculations show that the combination of the structural damping of the tower and the aerodynamic damping of the rotor and nacelle is too small. More energy is going into the system from the wind than out of it. The result is that the oscillations are getting out of control which will lead to failure.

A 'soft' generator, i.e. a generator with a high slip, can damp the oscillations, but such a generator is much more expensive and larger than a generator with lower slip. It is therefore avoided as a solution to the problem.

The oscillations can be reduced by changing the natural frequency of the tower, but it does not solve the main problem that more energy is going in than out of the system. The best and cheapest solution is to install damping means in the wind turbine. The damper can be placed where the movements occurs, but as the amplitude of the oscillations is largest in the top of the tower and in the nacelle, the upper part of the wind turbine is the optimal place. The damper may be placed in the tower, in the nacelle or outside.

Damping of oscillations at the wind turbines first bending frequency will in general reduce the fatigue loads on the tower and because of that reduce the necessary amount of steel in the tower.

However, an efficient damping of oscillations leading to a more lean construction of the tower of the wind turbine, especially in combination with higher towers, up to about 120 m, may result in the occurrence of oscillations of the second natural bending frequency of the wind turbine, which again may lead to fatigue loads on the tower. The damping of second order oscillations have not been recognised or addressed previously in the known literature of wind turbines for the reason that the problem has not been relevant for the shorter and more robust structure of wind turbine tower without damping means for damping the frequencies of the first natural bending mode

DESCRIPTION OF THE INVENTION

In order to fulfil an object of the present invention of providing an efficient damping of oscillations of the first natural bending frequency of the wind turbine commercially, it has been found to be advantageous to provide the wind turbine with a damper in which the oscillating mass is a liquid which opens for both a simple construction of the dampers as well as for the use of an inexpensive oscillating mass, such as water.

It is a further object of the present invention to provide damping of oscillations of the second natural bending frequency either in itself or in combination with damping of oscillations of the first natural bending frequency according to the invention.

The damper for oscillations of the first natural bending frequency can be made in many ways, but here is a description of the preferred concept according to the invention.

FIG. 1 shows a quadratic box where the length of the sides is L and the liquid level inside the box (when the box is stationary, i.e. there are no oscillations) is H.

For a certain first bending natural frequency of the tower and a certain size of the box are the optimal liquid level $H_{opt}$ given. It is calculated from the following two equations $$f_o = \frac{1}{2 \cdot \pi} \cdot \sqrt{\frac{\pi \cdot g}{L} - \tanh\left(\frac{\pi \cdot H_{teo}}{L}\right)} \quad \text{(eq. 1)}$$

$$H_{opt} = 1.06 \cdot H_{teo} \quad \text{(eq. 2)}$$

where

| | |
|---|---|
| L | length of box |
| g | acceleration of gravity |
| $H_{teo}$ | theoretic optimal liquid level |
| $H_{opt}$ | empirical optimal liquid level |
| $f_o$ | Natural frequency of the liquid (should be the same as the natural frequency of the tower, first bending mode) |

Equation 1 is found theoretically while the factor 1.06 is experimentally determined and the magnitude of the factor forms part of the present invention.

The total swinging mass of a wind turbine is determined by the mass of the nacelle, rotor and the equivalent mass of the tower—all put together. The equivalent mass of the tower is the mass that when placed at the top of the tower can replace all other tower mass while giving the same oscillation. For wind turbines produced and sold today the total swinging mass is mainly in the interval of 30,000–120,000 kg, but a mass of up to 300,000 kg is not unrealistic within a decade.

Experiments show that with the optimal liquid level in each box, tuned to the natural frequency of the tower, the wind turbine oscillations will be damped by 4–4.5% (logarithmic decrement) when the mass of all be liquid used constitutes 1% of the total swinging mass. Experiments show too that the expected damping of the system approximately is a linear function of the mass ratio (ratio between total liquid mass and total swinging mass), within a reasonable mass ratio interval from 0.5% to 8%. The damping of the box is the same for oscillations in all directions in the horizontal plane.

Logarithmic decrement, δ, of the system is defined by the equation;

$$\delta = \frac{1}{n} \ln\left(\frac{a_1}{a_n}\right) \cdot 100\% \quad \text{(eq. 3)}$$

where n is the number of oscillations
$a_1$ is the amplitude of the first oscillation
$a_n$ is the amplitude of the n-th oscillation Thus, the present invention relates to a wind turbine comprising
- a stationary part including a tower extending substantially vertically and a foundation to which a lower end part of the tower is fixed,
- a nacelle comprising a wind rotor having at least one blade arranged on a main shaft having a substantially horizontal rotation axis and a power transmission system,
- a yawing system comprising a stationary part being fixed to an upper end part of the tower and a movable part being fixed to the nacelle, the stationary part and the movable part being designed so that the nacelle is being supported vertically and horizontally by the tower and may pivot relatively to the tower about a substantially vertical yawing axis, and
- oscillation damping means provided at an upper part of the wind turbine and comprising at least one container being partly filled with a liquid, the primary damping frequency of the oscillation damping means being designed for damping oscillations of the first natural bending frequency of the wind turbine with a substantially unidirectional damping of a magnitude being equivalent to a logarithmic decrement of oscillations of said first natural frequency of the wind turbine of at least 2%, and the total mass of the liquid contained within the at least one container being equal to at least 0.6% of the mass of the nacelle.

The wind turbine has at least one blade, the most common number of blades is two or three for the kind of wind turbines addressed. The main shaft has a substantial horizontal axis of rotation which includes axes that are tilted as much as about 10 degrees from horizontal.

The total mass of liquid may be within the range of 0.6%–3%, preferably within the range of 0.9%–2.4% and most preferred within the range of 1.2%–1.8% of the mass of the nacelle so as to obtain a suitable magnitude of the damping. Though, for a wind turbine being situated at an off-shore location at which the tower of the wind turbine is exposed to excitation from sea waves, the total mass of liquid may be within the range of 1%–6%, preferably within the range of 1.5%–5% and most preferred within the range of 2%–4% of the mass of the nacelle in order to sufficiently dampen the combined excitation of the wind turbine from the wind, including excitation from the blade(s), and the excitation from the sea waves. The mass of the nacelle is typically within the range of 25–350 metric ton, such as within the range of 70–250 metric ton.

The magnitude of the damping may be equivalent to a logarithmic decrement of oscillations of said first natural frequency of the wind turbine within the range of 2%–20%, preferably within the range of 3%–12% and most preferred within the range of 4–8% in order for the damping to be suitable, depending on the allowable level of amplitudes and on the construction of the tower of the wind turbine, i.e. the structural damping of the oscillations. In particular, for a wind turbine being situated at an off-shore location at which the tower of the wind turbine is exposed to excitation from sea waves, the magnitude of the damping may be equivalent to a logarithmic decrement of oscillations of said first natural frequency of the wind turbine within the range of 2%–20%. preferably within the range of 3%–12% and most preferred within the range of 10–15% in order for the damping to be sufficient.

It has also been found that the damping means performs satisfactory as long as the primary damping frequency of the oscillation damping means deviates less than 5% from the first natural bending frequency of the wind turbine.

Experiments have shown that the optimal height of the surface of the liquid within the at least one container from a bottom part of the container is about 106% of the height found by using standard theoretical methods of calculating the appropriate height of liquid for matching the primary damping frequency of the container with the first natural bending frequency of the wind turbine.

For most types of wind turbines, the primary damping frequency of the oscillation damping means should be below 0.8 Hz, preferably within the range of 0.1–0.6 Hz.

It is an advantage in case the wind turbine is exposed to environmental factors, such as tide and temperature variation that may alter the natural frequencies of the wind turbine, that it comprises oscillation sensing means provided at an upper part of the wind turbine for detecting oscillations of the wind turbine and producing an output accordingly, control means for receiving the output from the sensing means and controlling means for adjusting the amount of liquid comprised within the at least one container so as to adapt the primary damping frequency of the at least one container to variations of the first natural bending frequency of the wind turbine It has been found that the side parts of each of the at least one container in order to achieve the optimal effect of the container preferably extends vertically at least 1.8 times the height of the surface of the liquid within the container from a bottom part of the container.

It is advantageous the oscillation damping means comprises a plurality of containers being partly filled with a liquid which makes it easier to fit the damping means into the top of the tower and/or into the nacelle and/or distributed on the outside of the tower/nacelle.

In particular, each of the plurality of containers has preferably a quasi-symmetric cross section as seen in a horizontal plane and quasi-symmetrical damping characteristics which is very suitable for a wind turbine that typically exhibits a symmetrical oscillation behaviour.

An optimal shape of the containers is that they have a substantially quadratic cross section as seen in a horizontal plane. Experiments has shown that such container for a given oscillating mass gives a damping of 60–100% more that a container having a circular cross section, mainly because a circulating motion of the liquid about a vertical axis largely is prevented by the corners of the quadratic container. Another alternative is U-tubes, such as two U-tubes containing a liquid and being placed with the bottom part of the U in a downwards direction and the two tubes being mutually turned 90 degrees. However, in order to provide a proper damping of the oscillations, the U-tubes has an amount of liquid in the vertically extending tubes, the mass of which liquid does not contribute the swinging mass and the total mass of liquid required for U-tubes exceeds the mass of liquid required for square boxes.

The side parts of each of the plurality of containers comprises extend preferably substantially vertically from a bottom part of the container.

It is very advantageous for a number of liquids that may be applied if the wind turbine comprises heating means for heating the liquid contained within the at least one container. The heating means may be used to prevent the temperature of the liquid from becoming below a predetermined minimum temperature and/or to maintain a substantial constant temperature of the liquid. By "a substantial constant temperature" is understood that the temperature may be maintained within a narrow temperature range of typically 10–20 degrees Celsius. The heating means may prevent the liquid from freezing if such a risk exists, depending on the characteristics of the liquid and the environment of the wind turbine, thus defining a freezing temperature as the minimum temperature. A minimum temperature may also be defined by the re-crystallisation temperature of a liquid comprising a salt, such as ferrous sulphate, zinc chloride etc. so as to avoid the formation of crystals in the liquid. By maintaining a substantially constant temperature the physical characteristics of the liquid are maintained so that environmental changes in temperature will not disturb the damping of the wind turbine. Control means controls the operation of the heating means. A preferred source of heat for the heating means is excessive heat from the power transmission system, i.e. the gear box and/or the generator and/or the frequency converter, and the heating means thus comprises means for transferring heat from cooling of the power transmission arranged in the nacelle to the liquid.

In order to Make the wind turbine fit to meet environmental changes and be operational under most circumstances, the freezing temperature of the liquid should be below −10 degrees Celsius, preferably below −18 degrees Celsius.

The density of the liquid is advantageously is at least 1.1 metric ton per cubic meter, preferably at least 1.4 metric ton per cubic meter and most preferred at least 1.8 metric ton per cubic meter so that the physical size of the oscillation damping means does to become too excessive.

A less expensive liquid to be chosen for the oscillating mass is water comprising at least one agent for lowering the freezing temperature of the water and/or at least one agent for increasing the density of the liquid. Furthermore, water does not present an environmental hazard if it leaks from the containers.

A number of different agents may be employed, among these a number of salts. A preferred agent is sodium chloride because is environmentally harmless and because the solubility of sodium chloride in water hardly changes with the temperature so that crystallisation will not occur in the container. Sodium chloride both lowers the freezing temperature of the water and increases the density.

The water may comprise at least 18 mass percentage of sodium chloride, preferably at least 22 mass percentage of sodium chloride and most preferred about 26 mass percentage of sodium chloride More preferred, inexpensive, agents are zinc chloride, which is less aggressive to metals than sodium chloride, and ferrous sulphate, with the use of which a density of at least 2, respectively 1.4 metric ton per cubic meter easily can be reached. Ferrous nitrate may also be applied as an agent and number of applicable agents to be added to water can be found in: Densities of Aqueous Solutions of Inorganic Substances, Söhnel and Novotný ISBN 0-444-99596, 1985.

Another suitable agent for both purposes is glycerol.

The present invention further relates to a wind turbine comprising a stationary part including a tower extending substantially vertically and a foundation to which a lower end part of the tower is fixed, a nacelle comprising a wind rotor having at least one blade arranged on a main shaft having a substantially horizontal rotation axis and a power transmission system, a yawing system comprising a stationary part being fixed to an upper end part of the tower and a movable part being fixed to the nacelle, the stationary part and the movable part being designed so that the nacelle is being supported vertically and horizontally by the tower and may pivot relatively to the tower about a substantially vertical yawing axis, and second oscillation damping means of which the primary damping frequency is designed for substantially unidirectional damping of oscillations of the second natural bending frequency of the wind turbine.

The second oscillation damping means are preferably provided at a middle part of the tower taken in a vertical direction for the reason that the lower of a wind turbine in the second natural bending mode of the wind turbine by and large acts as if it was fixed at the upper as well as the lower end due to the concentration of mass at the upper end. The amplitude of the oscillations has therefore a maximum around the middle of the tower, and the damping means should be positioned near the place of maximum amplitude The primary damping frequency of the second oscillation damping means should for most wind turbines be within the range of 1–10 Hz, preferably within the range of 2–5 Hz.

The damping of the second oscillation damping means is in a preferred embodiment of the present invention of a magnitude being equivalent to a logarithmic decrement of oscillations of said second natural frequency of the wind turbine of at least 2%, such as within the range of 2%–20%, preferably within the range of 3%–12% and most preferred within the range of 4–8%.

The second oscillation damping means may comprise one or more oscillation damping elements having a mass element arranged movably in a vertical direction from and to a neutral position of the mass element and energy storage means for receiving and storing kinetic energy from the mass element when it is moving away from the neutral position and for supplying kinetic energy to the mass element when it is moving towards the neutral position. The mass element may be a liquid but is preferably for the present damping means one or more solids The energy storage means may comprise one or more springs or the like but may alternatively means for moving the mass along a curved path so that energy is stored by the vertical position of the mass as potential energy.

The one or more oscillation damping elements may advantageously furthermore comprise damping means for receiving kinetic energy from the mass element when it is moving.

Although the wind turbine comprising the second oscillation damping means constitutes an invention in itself, the second oscillation damping means may advantageously be combined with the oscillation damping means for damping oscillations of the first natural bending mode of the wind turbine according to the invention as described previously.

Example

A full scale experiment is made on an NM1000/60-59 (1 MW wind turbine, 60 m rotor diameter, 59 m hub height) in Germany. 25 quadratic boxes of the See L=745 mm was placed at the top of the tower and in the nacelle. The boxes have 44.8 kg of a 26% (mass percent) of salt and water solution inside giving a total mass ratio of 1.73%. Following the above mentioned do this give an expected damping of the tower of 4%×1.73 =7% (log. decrement).

Measurements from the NM1000/60-59 wind turbine with tower damper installed show a clear reduction in the fatigue loads at wind speeds above 13 m/s and at wind speeds between 4–5 m/s (at 4–5 m/s are the wind turbine running on the auxiliary generator which give larger tower oscillations) compared to the fatigue loads for the wind turbine without tower damper installed.

It is expected that a damping of 5% (log. decrement) is enough to solve the oscillation problems. The necessary mass of liquid for a given wind turbine with a given swinging mass is therefore (5%/4%)=1.25% of the swinging mass. The optimal amount of liquid in each box is known when the size of the boxes and the first bending frequency of the tower are determined,. The necessary amount of boxes in the wind turbine can therefore be calculated. The boxes are placed in two columns at the top of the tower and the boxes are placed on top of each other.

It is important that the boxes are as large as possible because it clearly reduces the necessary amount of boxes. The liquid used should have as high a density as possible, it should be inexpensive and it should not freeze below −20° C. The mentioned 26% salt-water solution has got all three qualities:

1. The density is 1.2 kg/m$^3$
2. Salt and water is easy to get and inexpensive
3. The freezing point is −20° C.

but other liquids may be used too.

The natural frequencies of the first bending mode of the towers in NEG Micons wind turbines sold today are in the interval from 0.3 to 0.7 Hz. It is realistic that they within a decade will be in the interval from 0.1 to 0.8 Hz, which is the working limit of this damper concept with liquid in boxes.

The damping is close to optimal even though that the natural frequency of the tower stays within 5% of the natural frequency of the water. It is important to keep in mind that the natural frequency of the tower can vary for the same wind turbine because of different subsoil conditions.

What is claimed is:

1. A wind turbine comprising a stationary part including a tower extending substantially vertically and a foundation to which a lower end part of the tower is fixed, a nacelle comprising a wind rotor having at least one blade arranged on a main shaft having a substantially horizontal rotation axis and a power transmission system, a yawing system comprising a stationary part being fixed to an upper end part of the tower and a movable part being fixed to the nacelle, the stationary part and the movable part being designed so that the nacelle is being supported vertically and horizontally by the tower and may pivot relatively to the tower about a substantially vertical yawing axis, and oscillation damping means provided at the top of the tower and/or in the nacelle and/or distributed on the outside of the tower/nacelle and comprising at least one container being partly filled with a liquid, the primary damping frequency of the oscillation damping means being designed for damping oscillations of the first natural bending frequency of the wind turbine with a substantially unidirectional damping of a magnitude being equivalent to a logarithmic decrement of oscillations of said first natural frequency of the wind turbine of at least 2%, and the total mass of the liquid contained within the at least one container being equal to at least 0.6% of the mass of the nacelle.

2. A wind turbine according to claim 1, wherein the total mass of liquid is within the range of 0.6%–3%, preferably within the range of 0.9%–2.4% and most preferred within the range of 1.2%–1.8% of the mass of the nacelle.

3. A wind turbine according to claim 1 and being situated at an off-shore location at which the tower of the wind turbine is exposed to excitation from sea waves, wherein the total mass of liquid is within the range of 1%–6%, preferably within the range of 1.5%–5% and most preferred within the range of 2%–4% of the mass of the nacelle.

4. A wind turbine according to claim 1, wherein said magnitude of the damping is equivalent to a logarithmic decrement of oscillations of said first natural frequency of the wind turbine within the range of 2%–20%, preferably within the range of 3%–12% and most preferred within the range of 4–8%.

5. A wind turbine according to claim 1 and being situated at an off-shore location at which the tower of the wind turbine is exposed to excitation from sea waves, wherein said magnitude of the damping is equivalent to a logarithmic decrement of oscillations of said first natural frequency of the wind turbine within the range of 2%–20%, preferably within the range of 3%–12% and most preferred within the range of 10%–15%.

6. A wind turbine according to claim 1, wherein the primary damping frequency of the oscillation damping means deviates less than 5% from the first natural bending frequency of the wind turbine.

7. A wind turbine according to claim 1, wherein the height of the surface of the liquid within the at least one container from a bottom part of the container is about 106% of the height found by using standard theoretical methods of calculating the appropriate height of liquid for matching the damping frequency of the container with the first natural bending frequency of the wind turbine.

8. A wind turbine according claim 1, wherein the primary damping frequency of the oscillation damping means is below 0.8 Hz, preferably within the range of 0.1–0.6 Hz.

9. A wind turbine according to claim 1 and comprising oscillation sensing means provided at an upper part of the wind turbine for detecting oscillations of the wind turbine and producing an output accordingly, control means for receiving the output from the sensing means and controlling means for adjusting the amount of liquid comprised within the at least one container so as to adapt the primary damping frequency of the at least one container to variations of the first natural bending frequency of the wind turbine.

10. A wind turbine according to claim 1, wherein each of the at least one container comprises side parts extending vertically at least 1.8 times the height of the surface of the liquid within the container from a bottom part of the container.

11. A wind turbine according to claim 1, wherein the oscillation damping means comprises a plurality of containers being partly filled with a liquid.

12. A wind turbine according to claim 11, wherein each of the plurality of containers has a quasi-symmetric cross section as seen in a horizontal plane and quasi-symmetrical damping characteristics.

13. A wind turbine according to claim 12, wherein each of the plurality of containers has a substantially quadratic cross section as seen in a horizontal plane.

14. A wind turbine according to claim 11, wherein each of the plurality of containers comprises side parts extending substantially vertically from a bottom part of the container.

15. A wind turbine according to claim 1, comprising heating means for heating the liquid contained within the at least one container.

16. A wind turbine according to claim 15, comprising control means for controlling the operation of the heating means so as to prevent the temperature of the liquid from becoming below a predetermined minimum temperature.

17. A wind turbine according to claim 16, comprising control means for controlling the operation of the heating means so as to maintain a substantial constant temperature of the liquid.

18. A wind turbine according to claim 15, wherein the heating means comprises means for transferring heat from cooling of the power transmission arranged in the nacelle to the liquid.

19. A wind turbine according to claim 1, wherein the freezing temperature of the liquid is below −10 degrees Celsius, preferably below −18 degrees Celsius.

20. A wind turbine according to claim 19, wherein the liquid is water comprising at least one agent for lowering the freezing temperature of the water.

21. A wind turbine according to claim 20, wherein at least one agent is sodium chloride.

22. A wind turbine according to claim 21, wherein the liquid is water comprising at least 18 mass percentage of sodium chloride, preferably at least 22 mass percentage of sodium chloride and most preferred about 26 mass percentage of sodium chloride.

23. A wind turbine according to claim 20, wherein at least one agent is glycerol.

24. A wind turbine according to claim 1, wherein the density of the liquid is at least 1.1 metric ton per cubic meter, preferably at least 1.4 metric ton per cubic meter and most preferred at least 1.8 metric ton per cubic meter.

25. A wind turbine according to claim 24, wherein the liquid is water comprising at least one agent for increasing the density of the liquid.

26. A wind turbine comprising a stationary part including a tower extending substantially vertically and a foundation to which a lower end part of the tower is fixed, a nacelle comprising a wind rotor having at least one blade arranged on a main shaft having a substantially horizontal rotation axis and a power transmission system, a yawing system comprising a stationary part being fixed to an upper end part of the tower and a movable part being fixed to the nacelle, the stationary part and the movable part being designed so that the nacelle is being supported vertically and horizontally by the tower and may pivot relatively to the tower about a substantially vertical yawing axis, and oscillation damping means providing substantially unidirectional damping of oscillations, of which the primary damping frequency is substantially equal to the second natural bending frequency of the wind turbine, the oscillation damping means being provided at a middle part of the tower taken in a vertical direction.

27. A wind turbine according to claim 26, wherein the primary damping frequency of the oscillation damping means is within the range of 1–10 Hz, preferably within the range of 2–5 Hz.

28. A wind turbine according to claim 26, wherein the damping of the oscillation damping means is of a magnitude being equivalent to a logarithmic decrement of oscillations of said second natural frequency of the wind turbine of at least 2%.

29. A wind turbine according to claim 28, wherein said magnitude of the damping is equivalent to a logarithmic decrement of oscillations of said second natural frequency of the wind turbine within the range of 2%–20%, preferably within the range of 3%–12% and most preferred within the range of 4–8%.

30. A wind turbine according to claim 26, wherein the oscillation damping means comprises one or more oscillation damping elements having a mass element arranged movably in a vertical direction from and to a neutral position of the mass element and energy storage means for receiving and storing kinetic energy from the mass element when it is moving away from the neutral position and for supplying kinetic energy to the mass element when it is moving towards the neutral position.

31. A wind turbine according to claim 30, wherein one or more oscillation damping elements comprise damping means for receiving kinetic energy from the mass element when it is moving.

32. A wind turbine according to claim 26 and comprising oscillation damping means being designed for damping oscillations of the first natural bending frequency of the wind turbine according to claim 1.

* * * * *